United States Patent [19]
Cossi

[11] Patent Number: 5,864,113
[45] Date of Patent: Jan. 26, 1999

[54] CUTTING UNIT FOR PIPES PRODUCED IN CONTINUOUS LENGTHS

[76] Inventor: Giorgio Cossi, 32, via Milano, Marcon Venezia, Italy, 30020

[21] Appl. No.: 855,987

[22] Filed: May 14, 1997

[30] Foreign Application Priority Data

May 22, 1996 [IT] Italy .................................. PD96A129

[51] Int. Cl.⁶ .................................................. B23K 26/00
[52] U.S. Cl. ...................................................... 219/121.67
[58] Field of Search ........................ 219/121.67, 121.78, 219/121.79, 121.82, 121.72

[56] References Cited

U.S. PATENT DOCUMENTS

| | | | |
|---|---|---|---|
| 4,533,814 | 8/1985 | Ward .................................... | 219/121.79 |
| 4,609,807 | 9/1986 | Morrissy et al. ................... | 219/121.67 |
| 4,638,143 | 1/1987 | Akeel .................................. | 219/121.79 |
| 4,675,499 | 6/1987 | Nakai .................................. | 219/121.78 |
| 4,728,773 | 3/1988 | Roberts et al. ..................... | 219/121.78 |
| 4,742,206 | 5/1988 | Dietterich et al. ................. | 219/121.78 |

FOREIGN PATENT DOCUMENTS 3-47687  2/1991  Japan ................................ 219/121.82

*Primary Examiner*—Geoffrey S. Evans
*Attorney, Agent, or Firm*—Dowell & Dowell, P.C.

[57] ABSTRACT

A cutting unit for pipes which includes a laser beam which is reflected by a series of mirrors positioned adjacent the circumference of a pipe and wherein the mirrors are mounted on the ends of movable arms pivotally connected to one another and wherein one of the arms rotates around a pipe to be cut and the other arm serves as an optical and mechanical connection between a laser source and the arm which rotates.

13 Claims, 3 Drawing Sheets

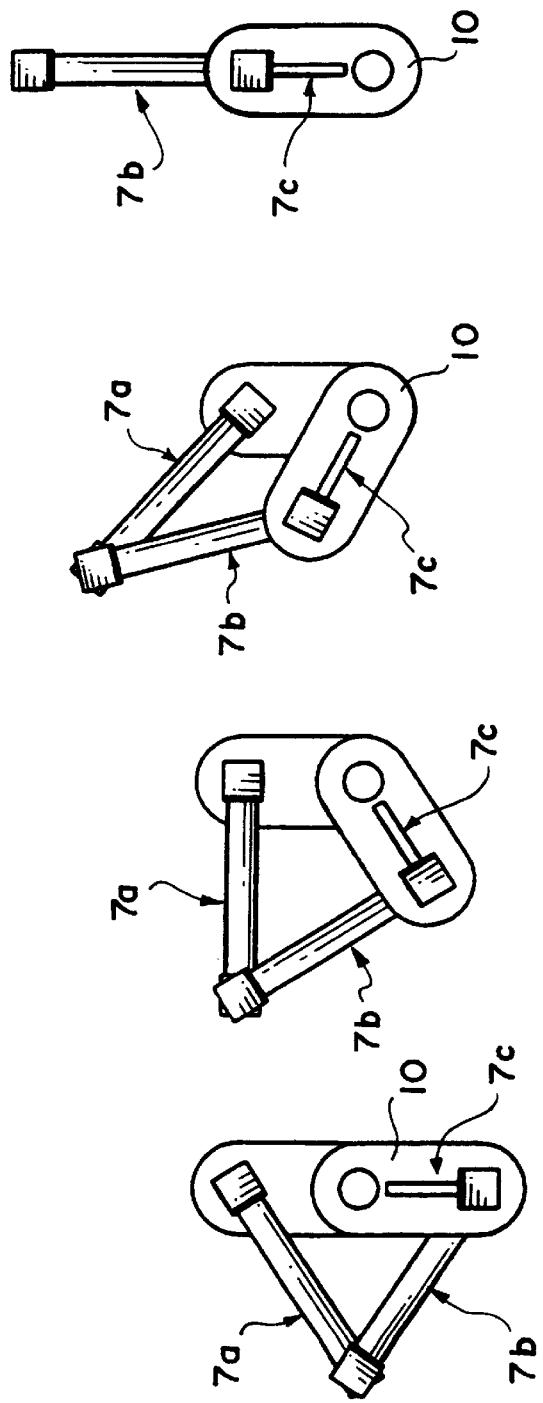
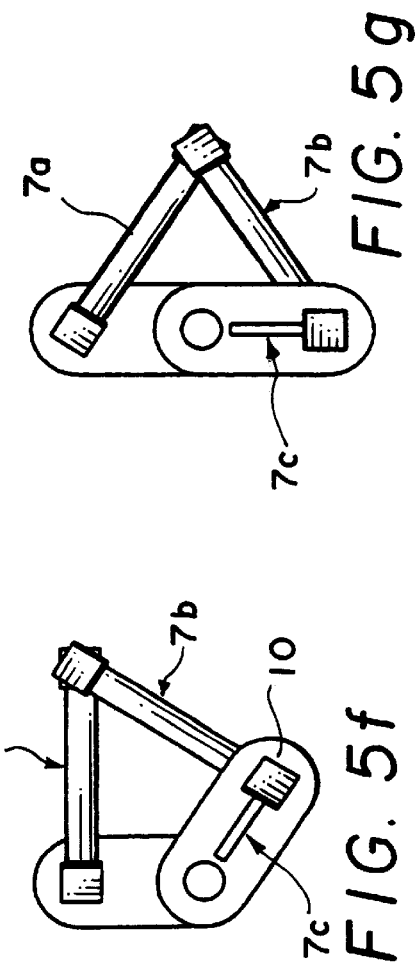
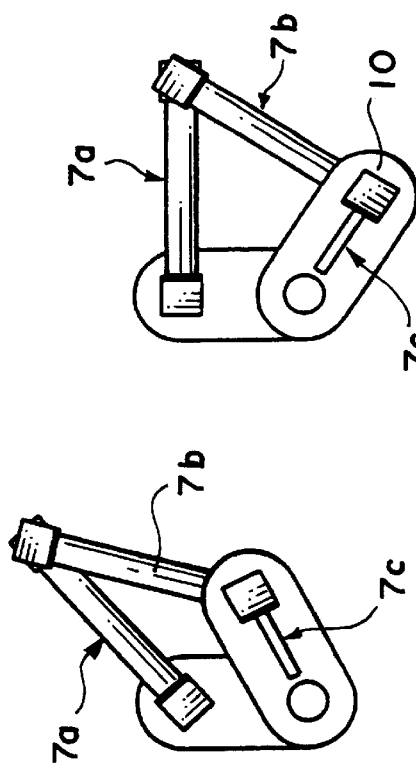

CUTTING UNIT FOR PIPES PRODUCED IN CONTINUOUS LENGTHS

BACKGROUND OF INVENTION

1. Field of the Invention

The invention relates to the sector of continuous pipe production and cutting.

In particular, it concerns the tools and devices for the cutting of continuous pipes in given lengths during the advancement of the pipe that is being produced.

2. History of the Related Art

Pipes are often produced through extrusion, if they are made of plastic, or through bending and welding, if they are made of metal. The pipe manufactured in this way is thus continuous and its length increases as production proceeds.

Therefore, it is necessary to cut it in given lengths for its storage, transport and final utilization.

At present these pipes produced in continuous lengths are cut by means of a mobile cutting device installed on a trolley and provided with blades or discs. The mobile device anchors to the pipe and follows it during its advancement, while a blade or disc cuts the pipe. As soon as the pipe is cut, the device rapidly goes back to its original position and is thus ready for the successive cutting operation.

These cutting devices present several drawbacks that are mainly due to the long cutting times and to the tool used for cutting.

After a certain number of cutting operations, the tool wears out and does not perform the successive cuts correctly, requires more time for cutting and leaves the pipe edges rough and imprecise. When the cutting tool reaches a considerable degree of wear, it is necessary to stop production in the whole plant in order to replace it.

Obviously, this affects the quantity and quality of the produced pipes negatively.

SUMMARY OF THE INVENTION

In order to eliminate the above mentioned inconveniences, a new cutting unit for pipes produced in continuous lengths has been designed and implemented, which does not make use of tools for the mechanical removal of the material, but of the laser technology instead.

The cutting unit can be used for cutting both metal pipes and pipes made of other materials such as teflon, polycarbonate, etc.

A laser with adequate power and a series of mirrors that deviate the laser beam around the pipe are installed on the trolley that follows the pipe coming out of the mold.

The main parts of the cutting unit comprise a trolley, a trolley driving motor, a device for anchoring the trolley to the pipe, a laser, two or more rotating arms provided with mirrors on one or both ends, an arm rotating and positioning motor, and an electric-electronic control unit for the cutting device itself.

The trolley is installed on one, two or more rails that are parallel to one another and to the advancement direction of the pipe that is being produced.

The trolley driving motor makes the trolley move forward and backward on the rails to either follow the pipe while it advances or go back to perform the successive cutting.

The anchoring device is a mechanism, for example an electromechanic jaw, suitable for anchoring the cutting unit to the pipe in such a way as to make them integral to each other and to prevent any relative movement between the trolley and the molded pipe that advances during the cuffing phase.

The laser is a device, of the known type and usually available on the market, that sends out a laser beam, the power of which is suitable for cutting metal or other materials. This laser is positioned on the trolley so that the beam sent out, either directly or through reflection, is parallel to the pipe.

The ends of each rotating arm are provided with mirrors positioned at 45 degrees with respect to the main axis of the arm itself, according to the arrangement used for the periscopes; in particular, one of the arms is provided with one mirror only. The three rotating arms are hinged to one another and each of them moves on a plane that is perpendicular to the pipe axis.

The three arms are arranged as follows: the first arm is provided with two mirrors, one of which is hinged to the fixed part of the trolley, while the other one is hinged to the first mirror of the second arm; the second mirror of the second arm is in turn hinged to the first mirror of the third arm.

The first arm with two mirrors rotates substantially orthogonally around the laser beam, deviates this beam with its first mirror along the direction of the axis of the arm itself, that is, perpendicularly to the beam direction, and then deviates it again parallely to the beam; the second arm with two mirrors serves as a mechanical and optical connection element between the first arm and the third arm, the latter being provided with one mirror only; the third arm has its end with mirror hinged to the second arm, while its free end rotates around the pipe axis and deviates the beam received from the second arm onto the pipe surface. The length of the third arm is substantially equal to the distance between the laser and the pipe, while the length of the other two pipes is greater than this distance.

The assembly of the three rotating arms makes it possible to direct the laser beam all around the pipe and to cut it avoiding any interference of the arms with the pipe itself.

The arm rotation motor is connected with the first and third arm by means of gear wheels, pulleys and belts, cylinders or similar elements. The motor mainly rotates the third arm provided with one mirror only, making it describe a circumference around the pipe and direct the laser beam onto the whole perimeter of the pipe.

The motor rotates also the first arm, and the second arm due to the linkage with the other two arms, so that the three arms can be correctly arranged in their movement around the pipe.

When the cutting begins, the third arm is positioned diametrically opposite the laser with respect to the pipe, while the other two arms form an angle at the side of the pipe. The third arm starts rotating towards the other two arms, until the first and second arm are exactly parallel to each other and the third arm is in the same position as the laser with respect to the pipe. The rotation continues until the third arm reaches the position diametrically opposite the laser again and the other two arms form an angle on the side opposite that on which they were positioned before. The following rotation takes place in the opposite direction.

In practical applications even more than one motor can be used to rotate and position the arms, while the starting point for the cutting operation can be fixed in any direction, adapting the arrangement of the arms.

The electronic control circuit supervises the operation of the cutting unit. It controls the start and stop of the trolley driving motor, the turning on and off of the laser, the start and stop of the arm rotation motor.

The cutting unit described above ensures the cutting of pipes produced in continuous lengths with no need to stop the production cycle and makes it possible to manufacture pipes having the desired length and finely-cut edges.

The use of the laser beam ensures also reduced cutting time in comparison with the known cutting devices. Therefore, the pipe advance speed can be increased, with consequent increase in productivity.

Further, the finishing of the edges, which was previously necessary due to the bad quality of the cutting, is not required any longer.

The operation of the cutting unit is described here below in its main phases.

The pipe edge reaches the cutting unit and passes through it; the trolley driving motor is promptly started and the trolley follows the pipe increasing its speed until it is equal to the pipe speed.

As soon as the speed of the trolley is equal to that of the pipe and the trolley itself is in the right cutting position, the anchoring device couples the cutting unit with the pipe. At this point the laser and the arm rotation motor are operated.

The laser beam is directed by the three arms onto the perimeter perpendicular to the pipe axis, carrying out a precise cut.

Once the pipe has been cut, that is, when the arm rotation cycle has been completely carried out, the laser is turned off, the anchoring device releases the pipe through an opposite command and the trolley driving motor is operated in order to move the cutting unit back to its original position, from where it will start the next cutting cycle.

The laser can be positioned on the mobile unit and therefore be moved together with it, or it can be in a fixed position, from which the beam can be deviated towards the mobile unit by means of a mirror.

BRIEF DESCRIPTION OF THE DRAWINGS

The following is just an example among many of the invention in question, illustrated in the attached drawings. In these drawings the laser beam is represented by the thick broken line.

FIGS. 5a–5g are front illustrational views showing the progressive positioning of arms directing a laser beam from a source to a pipe to be cut.

DESCRIPTION OF THE PREFERRED EMBODIMENT

Figure 2:
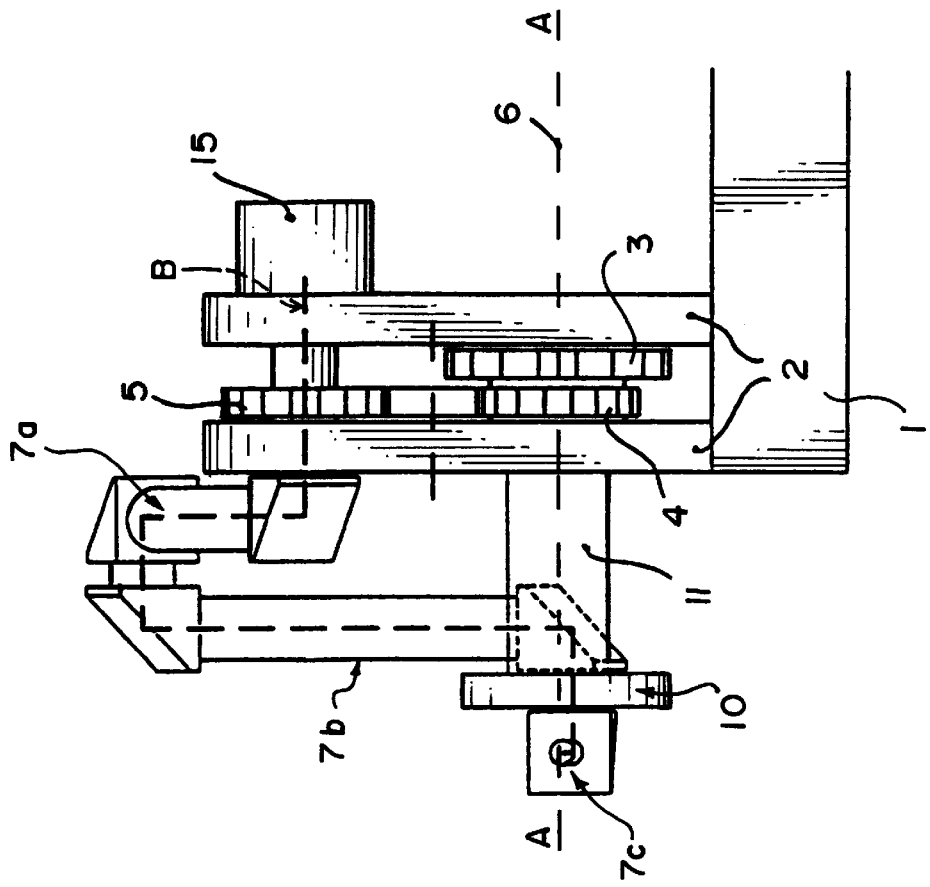
FIG. 2 is a side view of the cutting unit.
Figure 1:
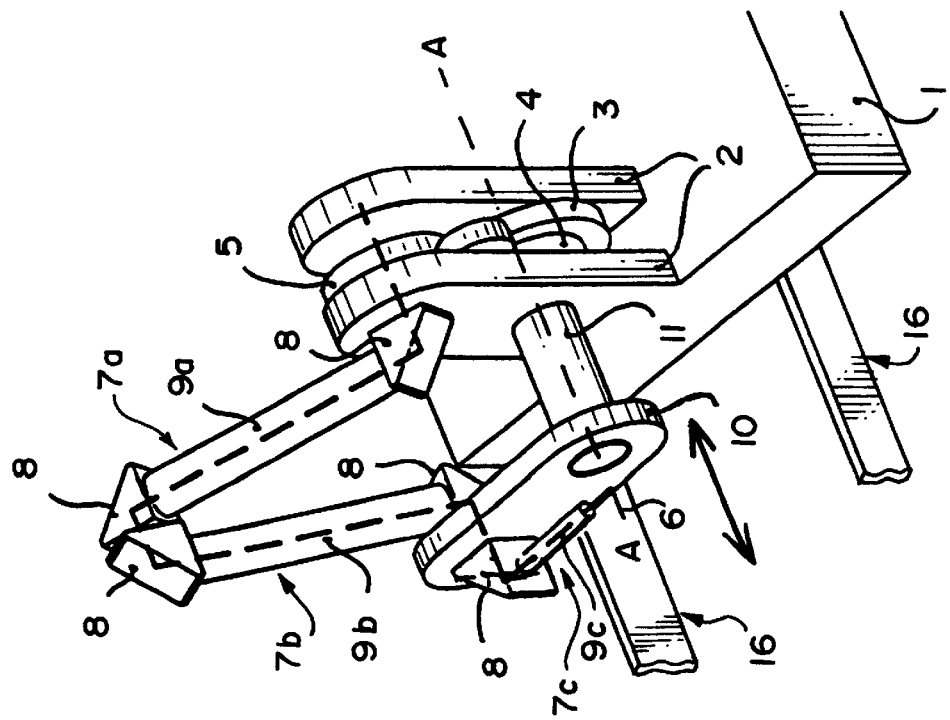
FIG. 1 is a partial perspective view of the cutting unit of the invention.
Figure 4:
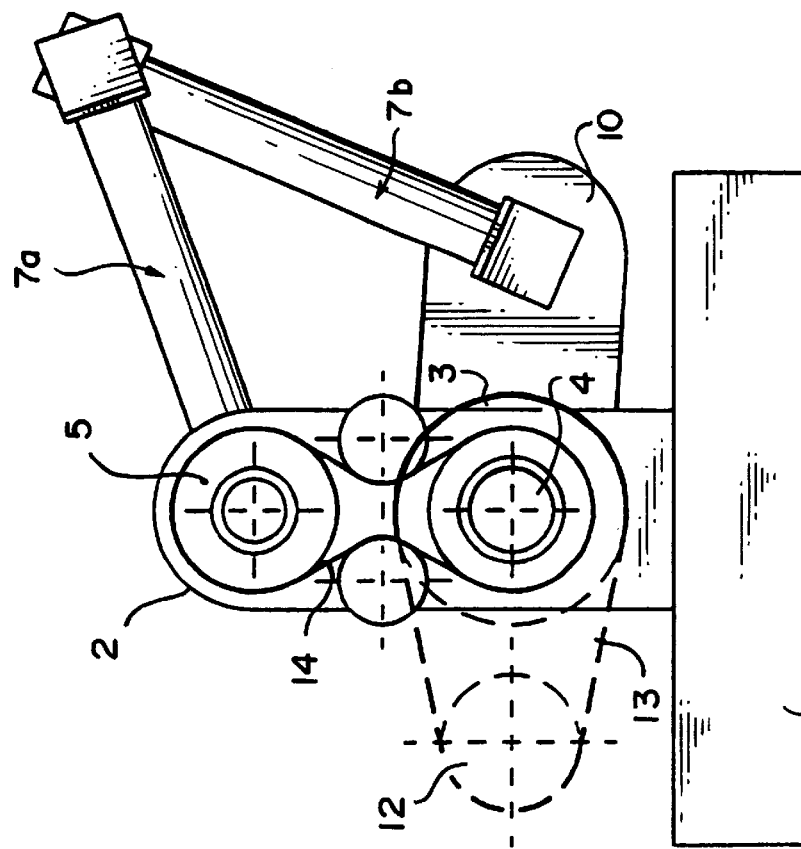
FIG. 4 is a rear view of the cutting unit.
Figure 3:
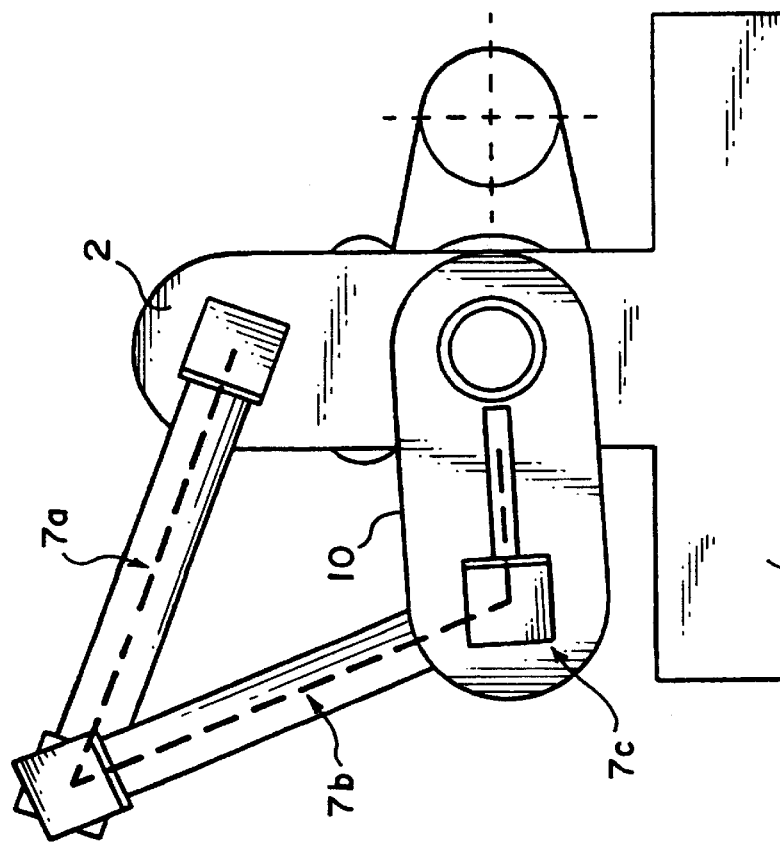
FIG. 3 is a front view of the cutting unit.

The trolley (1) is schematically represented by an horizontal plane and is reciprocally moveable on support rails illustrated at (16) so as to be parallel to a line "A—A" defining a direction of movement and the central axis of a pipe 6 being discharged from a molding machine (not shown).

On the trolley (1) two vertical supports (2) are provided, between which pulleys (3, 4, 5) are positioned, the pulleys being concave at the centre and resting on planes that are perpendicular to the pipe (6) axis.

In particular, two pulleys (3, 4) are joined together and coaxial to the axis of the pipe (6), while a pulley (5) is coaxial to the laser beam before it is deviated by the various mirrors.

One of the two coaxial pulleys (3) is set rotating by an electric motor (12) by means of a belt (13), while the other pulley (4) is connected with the pulley (5), coaxial with the laser beam, by means of a second belt (14). In this way, an identical rotation of the pulley (5) coaxial to the laser beam "B" corresponds to each rotation of the coaxial pulleys (3, 4).

Two of the three arms with mirrors (7a, 7b) substantially comprise two casings (8) containing the mirrors (12) connected by a hollow tubular element (9a, 9b).

The first arm (7a) is provided with a terminal casing (8) hinged to the outer support (2) of the trolley (1) and is bound to the pulley (5) that is coaxial with the laser beam.

The second arm (7b) with two mirrors has one of its terminal casings (8) hinged to the terminal casing (8) of the first arm (7a) non-coaxial with the pulley (5) and the second terminal casing (8) hinged to the terminal casing (8) of the third arm (7c).

The third arm (7c), provided with one mirror only, comprises a generically linear support (10), having a casing (8) containing the mirror at one end, and a hollow tubular element (9c) parallel to the support (10).

The end of the support (10) without casing is drilled and connected with the coaxial pulleys (3, 4) by means of a pipe (11); the hollow tubular element (9c) is applied to the casing (8) and extends almost to the hole of the third arm (7c).

The dimensions of the hole of the third arm (7c), of the pipe (11) that connects the third arm (7c) to the coaxial pulleys (3, 4) and of the central hole of the coaxial pulleys (3, 4) are such that the produced pipe can easily slide inside them.

The three arms (7a, 7b, 7c) lie on planes that are perpendicular to the axis of the pipe (6) and beyond the trolley edge; the mirrors inside the casings (8) are positioned at 45 degrees with respect to the axis of the arms (7a, 7b, 7c) and are directed in such a way as to deviate the laser beam from the direction of the arm (7a, 7b, 7c) axis towards the mirror of the arm (7a, 7b, 7c) to which it is hinged and vice versa.

In this application the laser (15) is installed on the inner support (2) of the trolley (1), but it may as well be in a fixed position outside the trolley (1), with the laser beam being sent out in the same direction.

The beam sent out by the laser (15) is deviated by the mirrors of the arms (7a, 7b, 7c) and crosses their tubular elements (9a, 9b, 9c) until being directed radially to the axis of the pipe (6), near the hole of the third arm (7c).

The motion transmitted by the electric motor to the pulleys (3, 4) that are coaxial to the axis of the pipe (6) rotates the three arms (7a, 7b, 7c), so that the laser beam coming out of the tubular element (9c) of the third arm gradually takes all the angular positions around the axis of the pipe (6).

Some moments of the arm in succession are represented in the Figures from 5a to 5g.

Each casing (8) contains a mirror the reflects the laser beam. To prevent the overheating of the mirror a flow of cooling liquid (for example water, not indicated in the figure for the sake of simplicity) is provided inside the casing (8).

The above are the basic outlines of the invention, on the basis of which the technician will be able to provide for implementation; therefore, any change which may be necessary upon implementation is to be regarded as completely protected by the present invention.

With reference to the above description and the attached drawings, the following claims are put forth.

I claim:

1. An assembly for cutting pipes into sections which pipes are being advanced in a first direction, the assembly comprising;

support means extending generally parallel to the first direction, a trolley mounted on said support means and moveable in a reciprocating motion parallel to the first direction, said trolley including means adapted to receive a pipe moving in the first direction, a laser source mounted on said trolley, a first hollow arm pivotally mounted on said trolley so as to rotate in a first plane which is perpendicular to a line extending in the first direction, said first arm having a first end having a first mirror which is aligned with said laser source so as to reflect a laser beam from said laser source to a second mirror positioned at a second end of said first arm, a second hollow arm pivotally connected at a first end thereof to said second end of said first arm so as to be movable in a second plane generally parallel to said first plane, said first end of said second arm including a first mirror reflecting the laser beam reflected from said second mirror of said first arm, said second arm having a second end including a second mirror for reflecting the laser beam reflected from said first mirror of said second arm to a hollow third arm, said third hollow arm having a first end pivotally connected relative to said second end of said second arm and including a first mirror for reflecting the laser beam reflected from said second mirror of said second arm to a second open end of said third arm, said third arm extending in a third plane which is generally parallel with said first and second planes, and said open end of said third arm is oriented generally perpendicularly toward the line such that the laser beam issuing therefrom is adapted to intersect a pipe moving along the line in the first direction, and a motor means mounted on the trolley for rotating said first, second and third hollow arms in said first, second and third planes respectively, and said first, second and third arms are oriented relative to one another such that said third arm is movable in a 360° motion about the line so that the laser beam issuing from said second end of said third arm will cut a pipe into sections as an intersection between said first and second arms is pivoted from one side of the line to an opposite side of the line without passing through the line.

2. The assembly of claim 1 in which said third arm includes an arm support having an opening therein which is axially aligned with the line whereby the support is adapted to receive a pipe therethrough.

3. The assembly of claim 2 in which said motor means is drivingly engaged with said arm support so as to impart rotation to said first, second and third arms in said first, second and third planes, respectively.

4. The assembly of claim 3 wherein said motor means is drivingly engaged with said first end of said first arm whereby said first arm and said arm support are simultaneously rotated.

5. The assembly of claim 4 wherein each of said first and second arms includes a hollow tube and casings mounted at opposite ends of the tubes in which said first and second mirrors of each of said first and second arms are mounted.

6. The assembly of claim 5 wherein said third arm includes a hollow tube having a casing mounted at said first end thereof in which said first mirror of said third arm is mounted.

7. The assembly of claim 1 wherein each of said first and second arms include a hollow tube and casings mounted at opposite ends of the tubes in which said first and second mirrors of each of said first and second arms are mounted.

8. The assembly of claim 7 wherein said third arm includes a hollow tube having a casing mounted at said first end thereof in which said first mirror of said third arm is mounted.

9. In an assembly for cutting pipes into sections which pipes are being advanced in a first direction and wherein a trolley is mounted on a support means so as to be moveable in a reciprocating motion parallel to the first direction and the trolley includes means adapted to receive and clamp a pipe moving in the first direction and a motor for moving the trolley with the pipe, and wherein the assembly also includes control means for controlling the operation of the motor, the improvement comprising:

a laser source mounted on the trolley, a first hollow arm pivotally mounted on the trolley so as to rotate in a first plane which is perpendicular to a line extending in the first direction, said first arm having a first end having a first mirror which is aligned with said laser source so as to reflect a laser beam from said laser source to a second mirror positioned at a second end of said first arm, a second hollow arm pivotally connected at a first end thereof to said second end of said first arm so as to be movable in a second plane generally parallel to said first plane, said first end of said second arm including a first mirror reflecting the laser beam reflected from said second mirror of said first arm, said second arm having a second end including a second mirror for reflecting the laser beam reflected from said first mirror of said second arm to a hollow third arm, said third hollow arm having a first end pivotally connected relative to said second end of said second arm and including a first mirror for reflecting the laser beam reflected from said second mirror of said second arm to a second open end of said third arm, said third arm extending in a third plane which is generally parallel with said first and second planes, and said open end of said third arm is oriented generally perpendicularly toward the line such that the laser beam issuing therefrom is adapted to intersect a pipe moving along the line in the first direction, and a motor means mounted on the trolley for rotating said first, second and third hollow arms in said first, second and third planes respectively, and said first, second and third arms are oriented relative to one another such that said third arm is movable in a 360° motion about the line so that the laser beam issuing from said second end of said third arm will cut a pipe into sections as an intersection between said first and second arms is pivoted from one side of the line to an opposite side of the line without passing through the line.

10. The assembly of claim 9 in which said third arm includes an arm support having an opening therein which is axially aligned with the line whereby the support is adapted to receive a pipe therethrough.

11. The assembly of claim 10 in which said motor means is drivingly engaged with said arm support so as to impart rotation to said first, second and third arms in said first, second and third planes, respectively.

12. The assembly of claim 11 wherein said motor means is drivingly engaged with said first end of said first arm whereby said first arm and said arm support are simultaneously rotated.

13. The assembly of claim 12 wherein each of said first and second arms includes a hollow tube and casings mounted at opposite ends of the tubes in which said first and second mirrors of each of said first and second arms are mounted, and said third arm including a hollow tube having a casing mounted at said first end thereof in which said first mirror of said third arm is mounted.

* * * * *